US012782665B2

(12) United States Patent
Kim

(10) Patent No.: US 12,782,665 B2
(45) Date of Patent: Nov. 3, 2026

(54) LENS ASSEMBLY

(71) Applicant: Samsung Electro-Mechanics Co., Ltd., Suwon-si (KR)

(72) Inventor: Sung Yeon Kim, Suwon-si (KR)

(73) Assignee: Samsung Electro-Mechanics Co., Ltd., Suwon-si (KR)

( * ) Notice: Subject to any disclaimer, the term of this patent is extended or adjusted under 35 U.S.C. 154(b) by 279 days.

(21) Appl. No.: 18/495,234

(22) Filed: Oct. 26, 2023

(65) Prior Publication Data

US 2024/0248276 A1 Jul. 25, 2024

(30) Foreign Application Priority Data

Jan. 25, 2023 (KR) ........................ 10-2023-0009626

(51) Int. Cl.
*G02B 7/02* (2021.01)

(52) U.S. Cl.
CPC ............. *G02B 7/021* (2013.01); *G02B 7/025* (2013.01); *G02B 7/026* (2013.01)

(58) Field of Classification Search
CPC .......... G02B 7/02; G02B 7/021; G02B 7/022; G02B 7/023; G02B 7/025; G02B 7/026; G02B 7/027; G02B 7/028
See application file for complete search history.

(56) References Cited

U.S. PATENT DOCUMENTS

2006/0146170 A1* 7/2006 Saito ...................... H04N 23/57 348/340
2019/0121158 A1* 4/2019 Chan .................... G02B 27/646
2019/0253594 A1 8/2019 Wei
2020/0049952 A1 2/2020 Wei
2021/0200065 A1 7/2021 Hung et al.
2021/0278622 A1* 9/2021 Liu ........................ G02B 7/023

FOREIGN PATENT DOCUMENTS

CN 206339752 U 7/2017
JP 2019-139216 A 8/2019
JP 2020-24390 A 2/2020
KR 10-0818514 B1 3/2008
KR 10-2010-0100063 A 9/2010
KR 10-2020-0016390 A 2/2020
KR 10-2439903 B1 9/2022

OTHER PUBLICATIONS

English translation and original document of CN 102053332A published on Nov. 5, 2011 (Year: 2011).*

English translation and original document of CN 102033285A published on Apr. 27, 2011 (Year: 2011).*

Korean Office Action issued on Jan. 10, 2025 in corresponding Korean Patent Application No. 10-2023-0009626. (8pages in English, 6pages in Korean).

Korean Office Action Issued on Sep. 18, 2025, in Counterpart Korean Patent Application No. 10-2023-0009626 (11 Pages in English, 8 Pages in Korean).

Korean Office Action Issued on Jul. 28, 2026, in Counterpart Korean Patent Application No. 10-2023-0009626 (7 Pages in English, 5 Pages in Korean).

* cited by examiner

*Primary Examiner* — Ephrem Z Mebrahtu
(74) *Attorney, Agent, or Firm* — NSIP Law

(57) ABSTRACT

A lens assembly includes a lens barrel having an outer diameter increasing from a subject side to an image side, and a ring member disposed on an outer circumferential surface of the lens barrel.

17 Claims, 5 Drawing Sheets

LENS ASSEMBLY

CROSS-REFERENCE TO RELATED APPLICATION(S)

This application claims the benefit under 35 USC § 119(a) of Korean Patent Application No. 10-2023-0009626, filed on Jan. 25, 2023, in the Korean Intellectual Property Office, the entire disclosure of which is incorporated herein by reference for all purposes.

BACKGROUND

1. Field

The present disclosure relates to a lens assembly.

2. Description of the Background

Camera modules are used in portable electronic devices such as smartphones.

A camera module is equipped with a lens assembly including a plurality of lenses. Recently, the number of lenses has been increased to improve the performance of the camera module, and the size of the camera module is trending toward miniaturization.

Additionally, a lens assembly provided with such a lens may be additionally provided with a lens holder. The lens holder may be equipped with an actuator (an OIS actuator) correcting shaking and an automatic focus control actuator (AF actuator).

The lens barrel may also be fixed to the lens holder with an ultraviolet (UV) curing bond that may be cured by irradiating ultraviolet rays from a top surface.

However, deformation of the lens barrel may occur due to heat caused by the ultraviolet light.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In one general aspect, a lens assembly includes a lens barrel having an outer diameter increasing from a subject side to an image side, and a ring member disposed on an outer circumferential surface of the lens barrel.

The lens assembly may further include a plurality of lenses disposed inside the lens barrel along an optical axis.

In the plurality of lenses, a diameter of a lens disposed closer to the image side may be greater than a diameter of a lens disposed closer to the subject side.

The lens assembly may further include a lens holder coupled to an outer side of the lens barrel.

The lens holder and the lens barrel may be fixed by an ultraviolet (UV) curing bond.

In an upper end of the subject side of the lens holder, a plurality of grooves may be disposed along an inner edge in contact with the lens barrel. The plurality of grooves may include the UV curing bond.

The lens holder may be disposed to be more biased toward the image side than the ring member.

The ring member may be fixed to the lens barrel by an ultraviolet (UV) curing bond.

The ring member may be fixed to the lens barrel by a thermosetting bond.

The ring member may be fixed to the lens barrel by heat fusion.

A material of the ring member and a material of the lens barrel may be similar.

The ring member may be disposed to have a diameter equal to a largest outer diameter of the lens barrel.

An inner diameter of the ring member may be between a minimum diameter and a maximum diameter of the lens barrel.

In another general aspect, a lens assembly includes a lens barrel having a tapering shape from a subject side to an image side, a ring member disposed on an outer circumferential surface of the lens barrel, and a lens holder disposed on the outer circumferential surface of the lens barrel to be more biased toward the image side than the ring member.

The ring member may be fixed to the lens barrel by heat fusion.

The lens holder may be coupled to the lens barrel by an ultraviolet (UV) curing bond.

On an upper end of the subject side of the lens holder, a plurality of grooves may be disposed along an inner edge in contact with the lens barrel. The plurality of grooves may include the UV curing bond.

The plurality of grooves may have four grooves relatively disposed at approximately equal intervals.

Other features and aspects will be apparent from the following detailed description, the drawings, and the claims.

Figure 1:
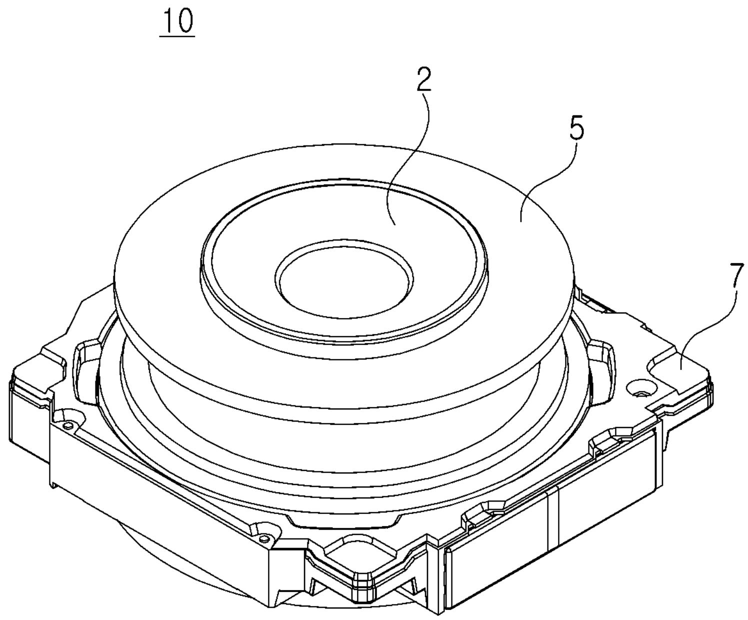
FIG. 1 is a schematic perspective view of a lens assembly according to an embodiment.

Throughout the drawings and the detailed description, unless otherwise described or provided, the same drawing reference numerals may be understood to refer to the same or like elements, features, and structures. The drawings may not be to scale, and the relative size, proportions, and depiction of elements in the drawings may be exaggerated for clarity, illustration, and convenience.

DETAILED DESCRIPTION

The following detailed description is provided to assist the reader in gaining a comprehensive understanding of the methods, apparatuses, and/or systems described herein. However, various changes, modifications, and equivalents of the methods, apparatuses, and/or systems described herein will be apparent after an understanding of the disclosure of this application. For example, the sequences within and/or of operations described herein are merely examples, and are not limited to those set forth herein, but may be changed as will be apparent after an understanding of the disclosure of this application, except for sequences within and/or of operations necessarily occurring in a certain order. As another example, the sequences of and/or within operations may be performed in parallel, except for at least a portion of sequences of and/or within operations necessarily occurring in an order, e.g., a certain order. Also, descriptions of features that are known after an understanding of the disclosure of this application may be omitted for increased clarity and conciseness.

The features described herein may be embodied in different forms, and are not to be construed as being limited to the examples described herein. Rather, the examples described herein have been provided merely to illustrate some of the many possible ways of implementing the methods, apparatuses, and/or systems described herein that will be apparent after an understanding of the disclosure of this application. The use of the term "may" herein with respect to an example or embodiment, e.g., as to what an example or embodiment may include or implement, means that at least one example or embodiment exists where such a feature is included or implemented, while all examples are not limited thereto.

Throughout the specification, when a component or element is described as being "on", "connected to," "coupled to," or "joined to" another component, element, or layer it may be directly (e.g., in contact with the other component or element) "on", "connected to," "coupled to," or "joined to" the other component, element, or layer or there may reasonably be one or more other components, elements, layers intervening therebetween. When a component or element is described as being "directly on", "directly connected to," "directly coupled to," or "directly joined" to another component or element, there can be no other elements intervening therebetween. Likewise, expressions, for example, "between" and "immediately between" and "adjacent to" and "immediately adjacent to" may also be construed as described in the foregoing.

Although terms such as "first," "second," and "third", or A, B, (a), (b), and the like may be used herein to describe various members, components, regions, layers, or sections, these members, components, regions, layers, or sections are not to be limited by these terms. Each of these terminologies is not used to define an essence, order, or sequence of corresponding members, components, regions, layers, or sections, for example, but used merely to distinguish the corresponding members, components, regions, layers, or sections from other members, components, regions, layers, or sections. Thus, a first member, component, region, layer, or section referred to in the examples described herein may also be referred to as a second member, component, region, layer, or section without departing from the teachings of the examples.

The terminology used herein is for describing various examples only and is not to be used to limit the disclosure. The articles "a," "an," and "the" are intended to include the plural forms as well, unless the context clearly indicates otherwise. As non-limiting examples, terms "comprise" or "comprises," "include" or "includes," and "have" or "has" specify the presence of stated features, numbers, operations, members, elements, and/or combinations thereof, but do not preclude the presence or addition of one or more other features, numbers, operations, members, elements, and/or combinations thereof, or the alternate presence of an alternative stated features, numbers, operations, members, elements, and/or combinations thereof. Additionally, while one embodiment may set forth such terms "comprise" or "comprises," "include" or "includes," and "have" or "has" specify the presence of stated features, numbers, operations, members, elements, and/or combinations thereof, other embodiments may exist where one or more of the stated features, numbers, operations, members, elements, and/or combinations thereof are not present.

Due to manufacturing techniques and/or tolerances, variations of the shapes shown in the drawings may occur. Thus, the examples described herein are not limited to the specific shapes shown in the drawings, but include changes in shape that occur during manufacturing.

Unless otherwise defined, all terms, including technical and scientific terms, used herein have the same meaning as commonly understood by one of ordinary skill in the art to which this disclosure pertains specifically in the context on an understanding of the disclosure of the present application. Terms, such as those defined in commonly used dictionaries, are to be interpreted as having a meaning that is consistent with their meaning in the context of the relevant art and specifically in the context of the disclosure of the present application, and are not to be interpreted in an idealized or overly formal sense unless expressly so defined herein.

Figure 2:
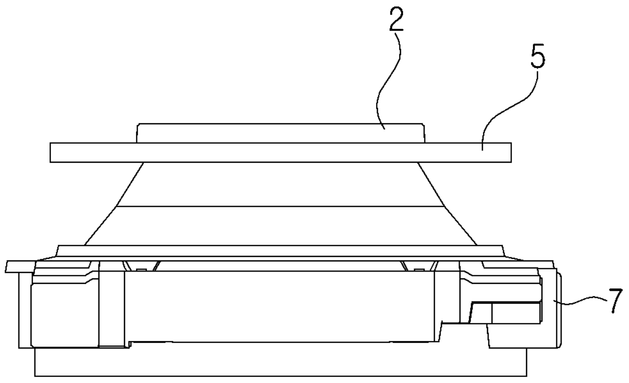
FIG. 2 is a schematic front view of a lens assembly according to an embodiment.
Figure 3:
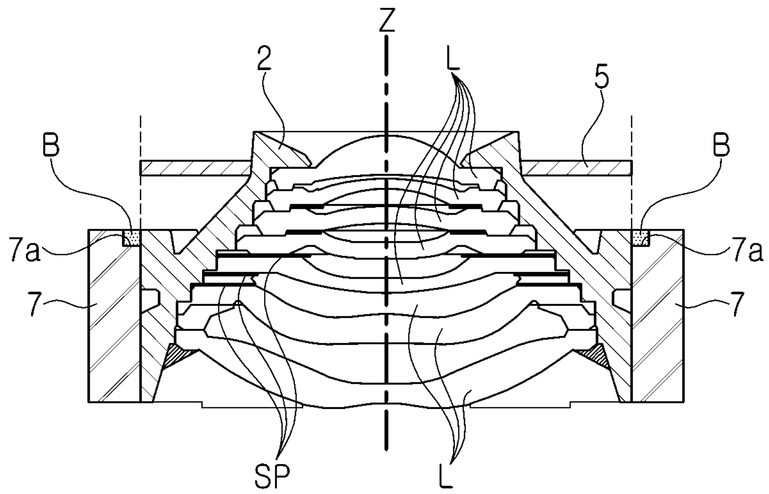
FIG. 3 is a schematic cross-sectional view of a lens assembly according to an embodiment.
Figure 4:
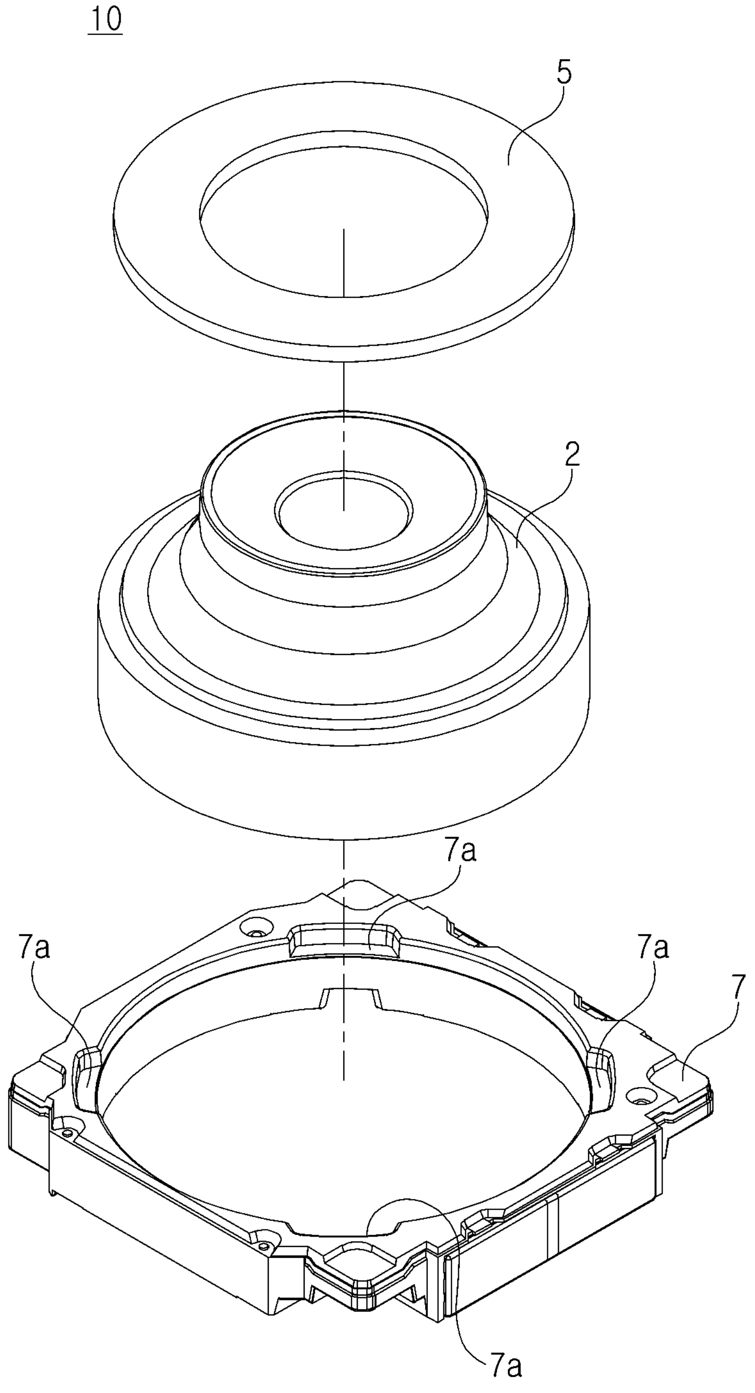
FIG. 4 is a schematic exploded perspective view of a lens assembly according to an embodiment.

FIG. 1 is a schematic perspective view of a lens assembly according to an embodiment. FIG. 2 is a schematic front view of a lens assembly according to an embodiment. FIG. 3 is a schematic front view of a lens assembly according to an embodiment. FIG. 4 is a schematic exploded perspective view of a lens assembly according to an embodiment.

Referring to FIGS. 1 to 4, a lens assembly 10 according to an embodiment includes a lens barrel 2 and a plurality of lenses L disposed inside the lens barrel 2. A ring member 5 may be fitted to the outer circumferential surface of the lens barrel 2. Additionally, a lens holder 7 may be coupled to the lens barrel 2. The ring member 5 may be provided to be biased toward the object (subject) rather than the lens holder 7.

The lens assembly 10 may include at least two lenses (L) disposed inside the lens barrel 2 along an optical axis (Z), and a spacer (SP) provided between the at least two lenses (L). In this embodiment, a structure including seven lenses is presented as an example, which is only an example, and all lens assemblies including two or more lenses are included in embodiments of the present disclosure.

As illustrated in FIG. 3, the lenses L may include an optical unit that produces an optical effect and a rib surrounding the edge of the optical unit. The optical unit may exert optical effects by itself or in combination with a plurality of lenses. The ribs are not intended for optical effects and may be used to support or align the lens.

Herein, when expressed as the diameter of the lenses L without further explanation, the diameter corresponds to a structure including both the optical unit L0 and the rib.

The optical unit and the rib may be provided in a disk shape. Accordingly, the optical unit may have a circular shape with a predetermined radius centered on the optical axis Z, and the rib may be provided in a ring shape on the outer side thereof. In addition, for convenience of explanation, the direction of the edge of a circle with a predetermined radius centered on the optical axis (Z) is defined as the circumferential direction.

Additionally, the lens L may have a D-cut portion in which a portion of the rib is cut, and the D-cut portion may have a straight shape.

The plurality of lenses (L) and spacers (SP) may be sequentially stacked in the lens barrel 2 to assemble the lens assembly 10.

The lens barrel 2 includes a narrower portion, an upper portion in FIG. 3, and a lower portion that is wide and open.

The lenses L are sequentially inserted through openings in the lower portion. In detail, the plurality of lenses may have a larger outer diameter on the image side than on the subject side. In addition, since the lens barrel 2 is also provided with a large diameter on the image side, rigidity thereof on the image side may be relatively weaker than rigidity on the subject side.

In addition, since the plurality of lenses (L) are combined with each other to produce optical effects, when sequentially assembling the lenses (L) in the lens barrel 2, the lenses (L) may be assembled by rotating each lens (L) in the circumferential direction to find an optimal position.

For example, when assembling the lens (L), direction optimization may be performed by rotating the mechanical error (concentricity/eccentricity) in the direction that most closely matches the optical axis. Optimized assembly may be possible by assembling each lens (L) at an optimized angle by rotating the lens 90 degrees in the circumferential direction based on the D-cut formed at one end of the circular lens.

However, if the shape of the lens barrel 2 is deformed due to the heat generated in the process in which assembly of the lens and spacer to the lens barrel 2 is completed and then assembled to the lens holder 7, the optical axis of the lenses (L) assembled to the lens barrel 2 may be distorted, which may cause deterioration of lens performance.

The lens barrel 2 may be fixed to the lens holder 7. For example, the lens barrel 2 may be fixed to the lens holder 7 by the ultraviolet (UV) curing bond (B). In this case, after inserting the lens barrel 2 into the lens holder 7, the ultraviolet ray is applied thereto from the top such that the bond is hardened by irradiation. Also, at this time, there may be a problem in which deformation of the lens barrel 2 occurs due to an exothermic reaction between ultraviolet light and the bond.

Accordingly, in this embodiment, the lens barrel 2 may be provided with the ring member 5. The ring member 5 may serve to prevent ultraviolet rays irradiated to the upper part of the lens assembly 10 from being transmitted to the lower end of the lens barrel 2, for example, the image side.

The ring member 5 may have a ring shape fitted to the outer circumferential surface of the lens barrel 2. In addition, although the name 'ring member' is used in the description and claims of this embodiment, this does not limit the shape, and in the case in which the outer diameter shape of the lens barrel 2 is other than circular, the shape of the ring member 5 may also be changed to correspond to the outer diameter shape of the lens barrel 2.

The inner diameter of the ring member 5 may correspond to the outer diameter of the lens barrel 2, and in detail, may have substantially similar size. Additionally, the outer diameter of the ring member 5 may have approximately the same as the portion in which the lens barrel 2 is inserted into the lens holder 7. In addition, the outer diameter of the ring member 5 may be provided to have the same diameter as a largest outer diameter of the lens barrel 2.

The ring member 5 may be fixed to the lens barrel 2 by an ultraviolet (UV) curing bond, fixed to the lens barrel 2 by a heat curing bond, or fixed to the lens barrel 2 by heat fusion. In other examples, the ring member 5 may be fixed to the lens barrel 2 by various methods whose descriptions are omitted.

The ring member 5 may be formed of a material that easily blocks ultraviolet rays or heat. For example, the ring member 5 may be formed of the same or different material as the material of the lens barrel 2.

The lens barrel 2 may be fitted into the lens holder 7. The lens holder 7 has a hollow portion into which the lens barrel 2 may be inserted, and the inner diameter of the hollow portion of the lens holder 7 may correspond to the outer diameter of the lens barrel 2.

In addition, a plurality of grooves 7*a* are provided in the object-side upper end of the lens holder 7 along the inner edge in contact with the lens barrel 2, and ultraviolet curing bond B may be applied to the grooves 7*a*. In this case, the ultraviolet curing bond may be cured by irradiated ultraviolet rays.

The plurality of grooves 7*a* may be provided at approximately equal intervals. Also, the plurality of grooves 7*a* may be provided as, for example, four.

Figure 7:
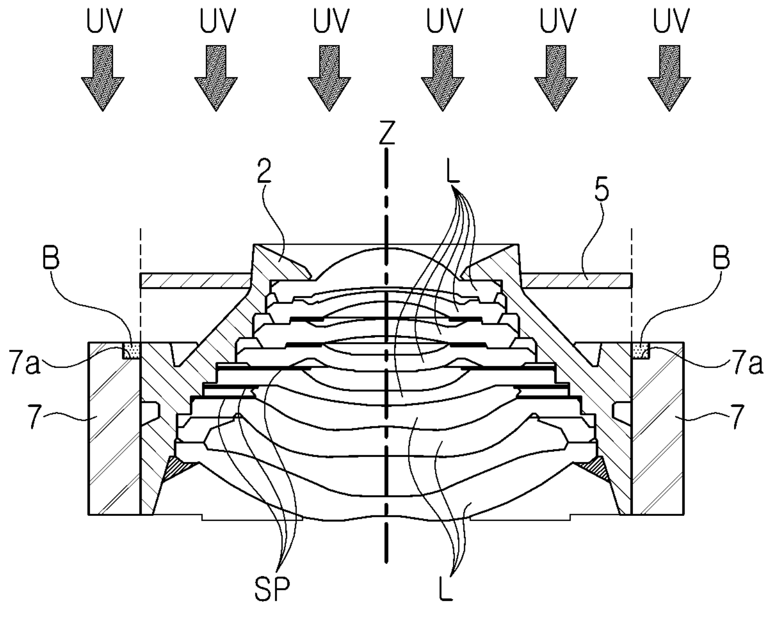
FIG. 7 is a reference diagram illustrating a shape in which ultraviolet light is irradiated to a lens assembly according to an embodiment.

FIG. 7 is a reference diagram illustrating a shape in which ultraviolet light is irradiated to a lens assembly according to an embodiment.

Referring to FIG. 7, after inserting the lens barrel 2 into a predetermined position in the lens holder 7 and applying the ultraviolet curing bond (B) to the grooves 7*a* for bonding, provided in the lens holder 7, the lens barrel 2 may be fixed to the lens holder 7 by irradiating ultraviolet rays (UV) from the upper side (subject side) to firmly harden the ultraviolet curing bond (B).

In this case, in the lens barrel 2, the ring member 5 is fitted to the outer circumferential surface of the lens barrel 2 to be biased toward the subject side rather than the lens holder 7 (in detail, the lens holder 7 is provided more biased toward the image side than the ring member 5), and since the ring member 5 blocks the irradiated ultraviolet rays (UV), ultraviolet rays (UV) cannot be projected directly below the ring member 5. Accordingly, the lens barrel 2 may be prevented from being deformed by heat.

However, since ultraviolet rays should be irradiated to the ultraviolet curing bond (B), the ring member 5 should not be larger than the inner diameter of the lens holder 7. For example, to increase efficiency, the outer diameter of the ring member 5 may be approximately the same size as the inner diameter of the lens holder 7 in a portion in which the lens barrel 2 is inserted into the lens holder 7.

Figure 5:
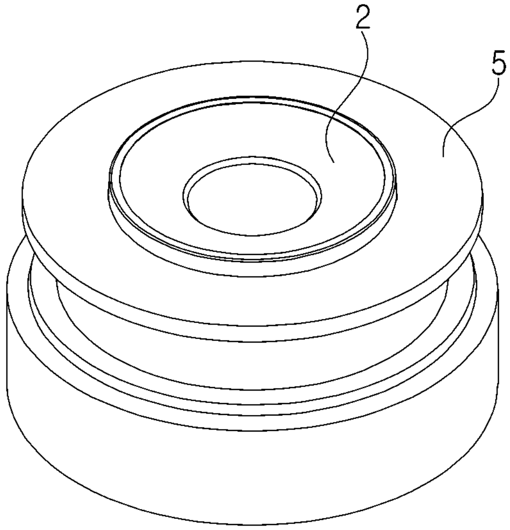
FIG. 5 is a perspective view of a lens assembly according to an embodiment with a lens holder omitted.
Figure 6:
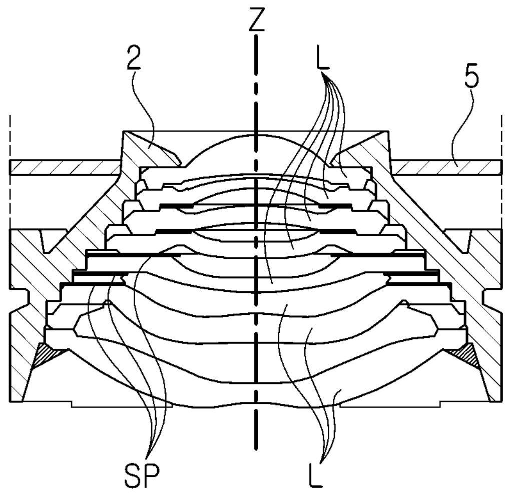
FIG. 6 is a cross-sectional view of a lens assembly according to an embodiment with the lens holder omitted.

FIG. 5 is a perspective view of a lens assembly according to an embodiment with a lens holder omitted, and FIG. 6 is a cross-sectional view of a lens assembly according to an embodiment with a lens holder omitted.

Referring to FIGS. 5 and 6, the lens assembly of this embodiment also includes the lens holder omitted in the drawing. In detail, a structure in which the ring member 5 is coupled to the lens barrel 2 may also correspond to a lens assembly.

Since in the illustrations in FIGS. 5 and 6, only the member of the lens holder 7 is omitted from FIGS. 1 to 4, the detailed structural description thereof is replaced with that provided above.

As set forth above, in the lens assembly according to an embodiment, deformation of the lens barrel may be significantly reduced even when the lens barrel is fixed to the lens holder by an ultraviolet (UV) curing bond.

In the lens assembly according to an embodiment, alignment of optical axes of a plurality of lenses may be facilitated, and positions of the plurality of lenses may be prevented from being misaligned even when the lens holder is coupled to the lens barrel.

While this disclosure includes specific examples, it will be apparent after an understanding of the disclosure of this application that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents.

Therefore, in addition to the above and all drawing disclosures, the scope of the disclosure is also inclusive of the claims and their equivalents, i.e., all variations within the scope of the claims and their equivalents are to be construed as being included in the disclosure.

What is claimed is:

1. A lens assembly comprising:

a lens barrel having an outer diameter increasing from a subject side to an image side;

a ring member disposed on an outer circumferential surface of the lens barrel; and a lens holder coupled to an outer side of the lens barrel, wherein an inner diameter of the ring member is between a minimum diameter and a maximum diameter of the lens barrel, and a portion of the lens barrel is disposed to pass through the inner diameter of the ring member, and wherein an outer diameter of the ring member is between the maximum diameter of the lens barrel and an inner diameter of the lens holder.

2. The lens assembly of claim 1, further comprising a plurality of lenses disposed inside the lens barrel along an optical axis.

3. The lens assembly of claim 2, wherein in the plurality of lenses, a diameter of a lens disposed closer to the image side is greater than a diameter of a lens disposed closer to the subject side.

4. The lens assembly of claim 1, wherein the lens holder and the lens barrel are fixed by an ultraviolet (UV) curing bond.

5. The lens assembly of claim 4, wherein in an upper end of the subject side of the lens holder, a plurality of grooves are disposed along an inner edge in contact with the lens barrel, and wherein the plurality of grooves comprises the UV curing bond.

6. The lens assembly of claim 1, wherein the lens holder is disposed to be more biased toward the image side than the ring member.

7. The lens assembly of claim 1, wherein the ring member is fixed to the lens barrel by an ultraviolet (UV) curing bond.

8. The lens assembly of claim 1, wherein the ring member is fixed to the lens barrel by a thermosetting bond.

9. The lens assembly of claim 1, wherein the ring member is fixed to the lens barrel by heat fusion.

10. The lens assembly of claim 1, wherein the ring member and the lens barrel are formed of a same material.

11. The lens assembly of claim 1, wherein the ring member is disposed to have a diameter equal to a largest outer diameter of the lens barrel.

12. The lens assembly of claim 1, wherein the ring member and the lens barrel are formed of different materials.

13. A lens assembly comprising:

a lens barrel having a tapering shape from a subject side to an image side;

a ring member disposed on an outer circumferential surface of the lens barrel; and a lens holder disposed on the outer circumferential surface of the lens barrel to be more biased toward the image side than the ring member, wherein on an upper end of the subject side of the lens holder, a plurality of grooves are disposed along an inner edge in contact with the lens barrel, and the plurality of grooves comprises an ultraviolet (UV) curing bond, and wherein the ring member is disposed to have a diameter equal to a largest outer diameter of the lens barrel.

14. The lens assembly of claim 13, wherein an inner diameter of the ring member is between a minimum diameter and a maximum diameter of the lens barrel.

15. The lens assembly of claim 13, wherein the ring member is fixed to the lens barrel by heat fusion.

16. The lens assembly of claim 13, wherein the lens holder is coupled to the lens barrel by the UV curing bond.

17. The lens assembly of claim 13, wherein the plurality of grooves has four grooves relatively disposed at approximately equal intervals.

* * * * *